United States Patent [19]
Lee

[11] 3,960,574
[45] June 1, 1976

[54] DETERGENT RESISTANT AUTO POLISH

[75] Inventor: Kenneth M. Lee, Bay City, Mich.

[73] Assignee: Dow Corning Corporation, Midland, Mich.

[22] Filed: May 13, 1974

[21] Appl. No.: 469,255

[52] U.S. Cl. .................................... 106/3; 106/10
[51] Int. Cl.$^2$ ...................... C09G 1/08; C09G 1/02
[58] Field of Search ............................ 106/3, 10, 4; 260/29.2 M, 46.5 R

[56] References Cited
UNITED STATES PATENTS

| | | | |
|---|---|---|---|
| 2,875,177 | 2/1959 | Bluestein | 260/29.2 M |
| 3,508,933 | 4/1970 | Yates | 106/11 |
| 3,763,069 | 10/1973 | Bey | 260/29.2 M |

*Primary Examiner*—Theodore Morris
*Attorney, Agent, or Firm*—Jack E. Moermond

[57] ABSTRACT

Polishes are made detergent resistant by incorporating therein carboxyfunctional siloxanes.

12 Claims, No Drawings

DETERGENT RESISTANT AUTO POLISH

Various additives such as silicones have been incorporated into polishes of all kinds, including automobile polishes, in an effort to impart various and sundry properties thereto. However, one desirable property almost universally still sought after is detergent resistance. That is to say, when one washes their automobile with a detergent solution the protective coating laid down by the polish is generally removed. The use of certain aminosilicone reaction products has been successful commercially in imparting detergent resistance to automobile polishes. It is the object of this invention to provide an alternative to the presently available aminosilicone reaction products which alternative will provide easier rub-out of the polish and impart detergent resistance equal to or better than that obtainable with the currently available commercial materials.

It has now been discovered that when a carboxy-functional siloxane composed of from 0.1 to 50 mole percent of $R_aR'_bSiO_{(4-a-b/2)}$ units and from 50 to 99.9 mole percent of $R''_cSiO_{(4-c/2)}$ units wherein R is a carboxy-functional radical attached to the silicon atom via a silicon-to-carbon bond, $a$ has an average value from 1 to 3, R' is a hydrocarbon or halogenated hydrocarbon radical containing from 1 to 18 carbon atoms, $b$ has an average value from 0 to 2, the sum of $a + b$ is from 1 to 3, R'' is a hydrocarbon or halogenated hydrocarbon radical containing from 1 to 18 carbon atoms and $c$ has an average value from 0 to 3, is incorporated into an automobile polish, easy rub-out and detergent resistance is imparted thereto.

In the above formula R can be any carboxyfunctional radical attached to the silicon atom via a silicon-to-carbon bond. In its broadest meaning herein a carboxyfunctional radical is one which contains a COOH group and is attached to the silicon atom via a silicon-carbon (Si—C) bond. So far as is known at this time, these two characteristics are the only essential ones for the instant invention. A preferred embodiment of R is when it is a carboxyfunctional radical of the structure HOOC—Q— wherein Q is a divalent linking group attached to the silicon atom via a silicon-to-carbon bond. Preferred embodiments of Q are alkylene radicals containing from 2 to 10 carbon atoms, and radicals containing from 2 to 10 carbon atoms which are composed of carbon, hydrogen and sulfur atoms, the sulfur atoms being present in the form of thioether linkages. Illustrative examples of Q are incorporated in the disclosure and examples which follow. Specific examples of suitable R radicals include, for example, —CH$_2$CH$_2$COOH, —CH$_2$CH(CH$_3$)COOH, —(CH$_2$)$_6$COOH, —(CH$_2$)$_{11}$COOH, —(CH$_2$)$_{18}$COOH, —CH$_2$CH$_2$SCH$_2$COOH, —C$_6$H$_4$—CH$_2$—C$_6$H$_4$—COOH, —CH$_2$—C$_6$H$_4$—C$_6$H$_4$—CH$_2$COOH, —CH$_2$CH$_2$OCH$_2$COOH, —C$_6$H$_4$-S-C$_6$H$_4$-COOH,

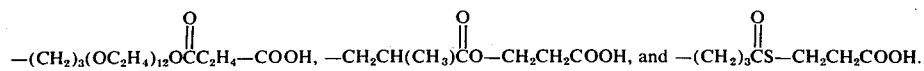

It is preferable that the R radical contain no more than 18 carbon atoms. There can be 1, 2 or 3 R radicals attached to the silicon atoms, i.e., $a$ has an average value of from 1 to 3. Generally speaking, there will be only one R radical ($a=1$) attached to most silicon atoms since these are the most practical siloxanes to prepare at this time.

The R' radical can be any hydrocarbon or halogenated hydrocarbon radical containing from 1 to 18 carbon atoms which is compatible with the carboxyfunctional radical. By way of illustration, R' can be an alkyl radical such as the methyl, ethyl, propyl, butyl, octyl, dodecyl and octadecyl radicals; an alkenyl radical such as the vinyl, allyl and hexenyl radicals; cycloalkyl radicals such as the cyclobutyl and cyclohexyl radicals; aryl radicals such as the phenyl, xenyl and naphthyl radicals; aralkyl radicals such as the benzyl and 2-phenylethyl radicals; alkaryl radicals such as the tolyl, xylyl and mesityl radicals; and the corresponding halohydrocarbon radicals such as the 3-chloropropyl, 4-bromobutyl, 3,3,3-trifluoropropyl, chlorocyclohexyl, bromophenyl, chlorophenyl, alpha, alpha, alpha-trifluorotolyl and the dichloroxenyl radicals. It is preferred that R' contain from 1 to 6 carbon atoms with the methyl radical being most preferred. There can be 0, 1 or 2 R' radicals attached to each silicon atom, i.e., the average value of $b$ is from 0 to 2, so long as the sum of $a + b$ (the total of R and R' radicals attached to each silicon atom) does not exceed 3 (i.e., the sum of $a + b$ is from 1 to 3). Preferably $b$ has a value of 0 or 1.

The R'' radical in the above formula can be any hydrocarbon or halogenated hydrocarbon radical containing from 1 to 18 carbon atoms. For specific examples of R'' radicals reference is made to the examples for R' set forth above which are equally applicable here and not listed again for the sake of brevity. The subscript $c$ can have an average value of from 0 to 3, i.e., $c$ can be 0, 1, 2 or 3. Preferably $c$ has an average value of 2.

The siloxane of this invention can be composed of from 0.1 to 50 mole percent of the carboxyfunctional siloxane units and from 50 to 99.9 mole percent of the other siloxane units. While it is obvious from the foregoing that the siloxane can be composed of up to 50 mole percent carboxyfunctional siloxane units, it is preferred at this time that the carboxyfunctional siloxane units constitute from 0.25 to 10 mole percent of the total siloxane units present.

The amount of the carboxyfunctional siloxane that can be added to an automobile polish to obtain improved detergent resistance and easy rub-out will vary. Generally speaking, however, at least 1% by weight is usually necessary to obtain reasonable detergent resistance; and it is preferable to use at least 2.5%. While larger quantities, say up to about 10% or more can be used, it generally will not be as economical to use more than 5%.

The carboxyfunctional siloxane can be used to impart easy rub-out and detergent resistance to any of the standard types of automobile polishes; namely, solvent based polishes, water based (emulsion) polishes, or paste wax polishes.

The various waxes, solvent, surfactants, thickening agents, abrasives, dyes, odorants, and other ingredients normally used in making automobile polishes are well known to those skilled in the art and are described in numerous places in the literature. Specific illustrative examples of suitable ingredients will be set forth in the examples.

Now in order that those skilled in the art may better understand how the present invention can be practiced, the following examples are given by way of illustration and not by way of limitation. All parts and percents referred to herein are by weight and all viscosities measured at 25°C. unless otherwise specified.

EXAMPLE 1

Five water based (emulsion) polishes were prepared which consisted essentially of 60% water, 25% Stoddard solvent, 10% anhydrous aluminum silicate abrasive (Kaopolite SF-O), 1% of a modified alkanol amide nonionic surfactant (Emcol 511) and 4% of various siloxane fluids. In composition A the siloxane fluid was composed of about 6 mole percent $(CH_3)HOOCCH_2SCH_2CH_2SiO$ units, about 92 mole percent $(CH_3)_2SiO$ units and about 2 mole percent $(CH_3)_3SiO_{1/2}$ units. In composition B the siloxane was composed of about 10 mole percent $(CH_3)HOOCCH_2SCH_2CH_2SiO$ units, about 88 mole percent $(CH_3)_2SiO$ units and about 2 mole percent $(CH_3)_3SiO_{1/2}$ units. In composition C the siloxane was composed of about 10 mole percent $(CH_3)HOOCCH(CH_3)CH_2SiO$ units, about 88 mole percent $(CH_3)_2SiO$ units and about 2 mole percent $(CH_3)_3SiO_{1/2}$ units. In composition D the siloxane was composed of about 2 mole percent $(CH_3)HOOCCH_2SCH_2CH_2SiO$ units, about 96 mole percent $(CH_3)_2SiO$ units and about 2 mole percent $(CH_3)_3SiO_{1/2}$ units. In composition E the siloxane was a reaction product prepared by simply blending 75% of a hydroxyl endblocked polydimethylsiloxane fluid, 15% of $(CH_3O)_3Si(CH_2)_3NHCH_2CH_2NH_2$ and 10% of $(CH_3O)_3SiCH_3$. Composition E was included for purposes of comparison as representing a currently available commercial detergent resistant siloxane additive for polishes.

To evaluate the rub-out characteristics of the above prepared polishes they were applied with a cloth to panels of automobile steel having a standard black automobile paint finish thereon. After application the polish was allowed to dry about 15–20 minutes and then buffed by hand to a gloss. The ease with which the polish was rubbed out or buffed was rated subjectively on a scale of 1 to 5 with a rating of 1 being excellent (easy to rub out) and 5 being poor (hard to rub out, streaks).

The above prepared polishes were also tested for detergent resistance. Panels were prepared as above for the rub-out test and then allowed to stand overnight. Then about a 1½ inches in diameter puddle of Wisk liquid detergent was placed on the panel. (Wisk is a heavy duty liquid detergent composed of 20–25% inorganic builder salts—complex silicates and phosphates, 10–15% synthetic detergents—dodecylbenzene sulfonate, tallow alcohol sulfate, lauric diethanolamide, alkyl phenol ethylene oxide adduct, 10% solubilizing agent—sodium alkyl naphthaline sulfonate, 0.2–0.4% anti-redeposition agent—sodium carboxy methylcellulose, 0.0–0.6% colloidal dispersant—methylcellulose, 0.1% optical brightener, q.s. water.) Cheesecloth wet with water is then used to wash a 6 inch – 8 inch diameter spot on the panel with the Wisk for 30 seconds. The panel is then rinsed with water under a tap until all the Wisk has been removed. The panel is then held in a vertical position and the time for the water to run off observed. If the water runs off slowly this indicates a loss of polish film. Also the panel is examined for change (loss) of gloss which indicates loss of polish film. The panel is rated subjectively on a scale of 1 to 5 with 1 being best detergent resistance (no loss of polish film) and 5 being poor (complete loss of polish film).

The results from the preceding tests are set forth in the table below.

| Compostion | Rub-Out | Detergent Resistance |
|---|---|---|
| A | 1 | 3 |
| B* | 2 | 2 |
| C | 1 | 4 |
| D | 2 | 1 |
| E** | 3 | 1 |

*This emulsion broke after standing about 1 week.
**Included for comparison.

EXAMPLE 2

A solvent based polish in accordance with this invention can be prepared when 5% Stoddard solvent, 1% of a microcrystalline wax and 1.5% of a carboxy-functional siloxane composed of about 2 mole percent $(CH_3)HOOCCH_2SCH_2CH_2SiO$ units, about 96 mole percent $(CH_3)_2SiO$ units and about 2 mole percent $(CH_3)_3SiO_{1/2}$ units are heated together to melt the wax, then adding 92.5% V.M. & P naphtha while stirring to obtain good mixing, and finally cooling.

EXAMPLE 3

A paste wax polish/cleaner in accordance with this invention can be prepared consisting essentially of 86% Stoddard solvent, 8% carnauba wax, 2% micro-crystalline wax and 4% of the carboxyfunctional siloxane of Example 2.

EXAMPLE 4

When the carboxyfunctional siloxanes set forth below are substituted for those used in the preceding examples, similar results are obtained.

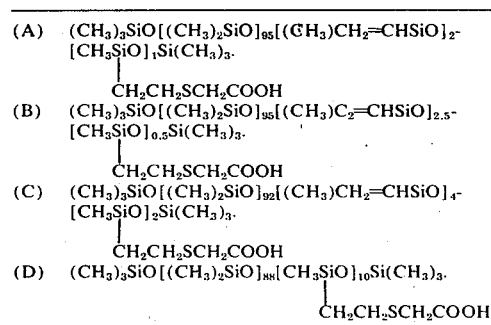

(A) $(CH_3)_3SiO[(CH_3)_2SiO]_{95}[(CH_3)CH_2=CHSiO]_2$-$[CH_3SiO]_1Si(CH_3)_3$.
    |
    $CH_2CH_2SCH_2COOH$ (B) $(CH_3)_3SiO[(CH_3)_2SiO]_{95}[(CH_3)C_2=CHSiO]_{2.5}$-$[CH_3SiO]_{0.5}Si(CH_3)_3$.
    |
    $CH_2CH_2SCH_2COOH$ (C) $(CH_3)_3SiO[(CH_3)_2SiO]_{92}[(CH_3)CH_2=CHSiO]_4$-$[CH_3SiO]_2Si(CH_3)_3$.
    |
    $CH_2CH_2SCH_2COOH$ (D) $(CH_3)_3SiO[(CH_3)_2SiO]_{88}[CH_3SiO]_{10}Si(CH_3)_3$.
    |
    $CH_2CH_2SCH_2COOH$

-continued (E) $(CH_3)_3SiO[(CH_3)_2SiO]_{96}[CH_3\underset{|}{Si}O]_2Si(CH_3)_3$.
    $CH_2CH(CH_3)COOH$ (F) $HO(CH_3)_2SiO[(CH_3)_2SiO]_{95}[CH_3\underset{|}{Si}O]_5Si(CH_3)_2OH$.
    $(CH_2)_3SCH_2CH_2COOH$ (G) $HO(CH_3)_2SiO[(CH_3)_2SiO]_{50}[CH_3\underset{|}{Si}O]_{50}Si(CH_3)_2OH$.
    $CH_2CH_2SCH_2COOH$ (H) 3 mole percent $(CH_3)_3SiO_{1/2}$
    87 mole percent $(CH_3)_2SiO$
    10 mole percent $(CH_3)HOOCCH_2CH_2CH_2SiO$ (I) 5 mole percent $C_5H_{11}SiO_{3/2}$
    92 mole percent $(CH_3)_2SiO$
    3 mole percent $(CH_3)HOOCCH_2OCH_2CH_2CH_2SiO$ (J) 10 mole percent $(CH_3)C_6H_5SiO$
    85 mole percent $(CH_3)_2SiO$
    5 mole percent $(CH_3)HOOCCH_2CH_2CH_2CH_2CH_2CH_2SiO$ (K) 7 mole percent $(CH_3)CF_3CH_2CH_2SiO$
    83 mole percent $(CH_3)_2SiO$
    7 mole percent $(CH_3)HOOCCH_2CH_2SiO$
    3 mole percent $HOOCC_6H_4SiO_{3/2}$ (L) 1 mole percent $ClCH_2CH_2CH_2SiO_{3/2}$
    98 mole percent $(CH_3)_2SiO$
    1 mole percent $(CH_3)HOOCCH_2CH_2SiO$ (M) 2 mole percent $SiO_{4/2}$
    48 mole percent $(CH_3)_2SiO$
    50 mole percent $(CH_3)HOOCCH_2CH_2CH_2COOCH_2CH_2CH_2SiO$ (N) 2 mole percent $Cl_2C_6H_3SiO_{3/2}$
    88 mole percent $(CH_3)_2SiO$
    10 mole percent $(CH_3)HOOCCH_2SCH_2CH_2SiO$ (O) 2 mole percent $(CH_3)_3SiO_{1/2}$
    97.9 mole percent $(CH_3)_2SiO$
    0.1 mole percent $(CH_3)HOOCCH_2SCH_2CH_2SiO$ (P) 5 mole percent $(CH_3)_2(C_6H_5)SiO_{1/2}$
    10 mole percent $(CH_3)(C_6H_5)SiO$
    80 mole percent $(CH_3)_2SiO$
    5 mole percent $(BrCH_2CH_2CH_2)HOOCCH_2CH_2SCH_2CH_2CH_2SiO$ That which is claimed is:

1. In a polish formulation containing as components thereof a wax and/or an abrasive and optionally at least one member selected from the group consisting of solvents, surfactants, thickening agents, dyes, odorants, and other ingredients normally used in making polishes, the improvement which consists of incorporating therein 1 to 10% by weight of a carboxyfunctional siloxane composed of from 0.1 to 50 mole percent of $R_aR'_bSiO_{(4-a-b/2)}$ units and from 50 to 99.9 mole percent of $R''_cSiO_{(4-c/2)}$ units wherein R is a carboxyfunctional radical attached to the silicon atom via a silicon-to-carbon bond, $a$ has an average value from 1 to 3, R' is a hydrocarbon or halogenated hydrocarbon radical containing from 1 to 18 carbon atoms, $b$ has an average value from 0 to 2, the sum of $a + b$ is from 1 to 3, R'' is a hydrocarbon or halogenated hydrocarbon radical containing from 1 to 18 carbon atoms, and $c$ has an average value from 0 to 3.

2. A polish as defined in claim 1 which is solvent based.

3. A polish as defined in claim 2 which is in the form of an aerosol.

4. A polish as defined in claim 1 which is water based.

5. A polish as defined in claim 1 which is in the form of a paste wax.

6. A polish as defined in claim 1 wherein the carboxyfunctional siloxane is composed of 0.25 to 10 mole percent of $R_aR'_bSiO_{(4-a-b/2)}$ units and from 90 to 99.75 mole percent of $R''_cSiO_{(4-c/2)}$ units, R is a radical of the structure HOOC—Q— wherein Q is a divalent linking group attached to the silicon atom via a silicon-to-carbon bond, $a$ has an average value of 1, R' is a hydrocarbon radical containing from 1 to 6 carbon atoms, $b$ has an average value of 0 to 1, R'' is a hydrocarbon radical containing from 1 to 6 carbon atoms, and $c$ has an average value of about 2.

7. A polish as defined in claim 6 wherein Q is an alkylene radical containing from 2 to 10 carbon atoms, R' is a methyl radical, $b$ has an average value of 1 and R'' is a methyl radical.

8. A polish as defined in claim 7 wherein the carboxyfunctional siloxane is composed of about 10 mole percent $(CH_3)HOOCCH(CH_3)CH_2SiO$ units, about 88 mole percent $(CH_3)_2SiO$ units and about 2 mole percent $(CH_3)_3SiO_{1/2}$ units.

9. A polish as defined in claim 6 wherein Q is composed of carbon, hydrogen and sulfur atoms, the sulfur atoms being present in the form of ether linkages, said Q containing from 2 to 10 carbon atoms, R' is a methyl radical, $b$ has an average value of 1 and R'' is a methyl radical.

10. A polish as defined in claim 8 wherein the carboxyfunctional siloxane is composed of about 10 mole percent $(CH_3)HOOCCH_2SCH_2CH_2SiO$ units, about 88 mole percent $(CH_3)_2SiO$ units and about 2 mole percent $(CH_3)_3SiO_{1/2}$ units.

11. A polish as defined in claim 8 wherein the carboxyfunctional siloxane is composed of about 6 mole percent $(CH_3)HOOCCH_2SCH_2CH_2SiO$ units, about 92 mole percent $(CH_3)_2SiO$ units and about 2 mole percent $(CH_3)_3SiO_{1/2}$ units.

12. A polish as defined in claim 8 wherein the carboxyfunctional siloxane is composed of about 2 mole percent $(CH_3)HOOCCH_2SCH_2CH_2SiO$ units, about 96 mole percent $(CH_3)_2SiO$ units and about 2 mole percent $(CH_3)_3SiO_{1/2}$ units.

* * * * *